US008311947B2

(12) United States Patent
Sunkammurali et al.

(10) Patent No.: US 8,311,947 B2
(45) Date of Patent: Nov. 13, 2012

(54) ONLINE SERVICE SYNDICATION

(75) Inventors: Krishna Kumar Sunkammurali, Sammamish, WA (US); Michel Burger, Woodinville, WA (US); Ashutosh Badwe, Redmond, WA (US); Jignesh Kacharia, Redmond, WA (US); Rammohan Nagasubramani, Kirkland, WA (US); Roy Peter D'Souza, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 543 days.

(21) Appl. No.: 12/323,814

(22) Filed: Nov. 26, 2008

(65) Prior Publication Data

US 2010/0131380 A1    May 27, 2010

(51) Int. Cl.
*G06F 21/00*    (2006.01)
(52) U.S. Cl. ............... 705/52; 726/28; 726/29; 726/30; 726/31; 715/201; 715/202; 715/203; 715/239; 709/230; 709/231; 709/232
(58) Field of Classification Search ............... 705/52; 726/28–31; 715/201–203, 239; 709/230–232
See application file for complete search history.

(56) References Cited

U.S. PATENT DOCUMENTS

| 6,385,729 | B1 * | 5/2002 | DiGiorgio et al. ............ 726/9 |
| 6,976,010 | B2 | 12/2005 | Banerjee et al. |
| 7,099,950 | B2 * | 8/2006 | Jones et al. ............ 709/230 |
| 7,149,698 | B2 * | 12/2006 | Guheen et al. ............ 705/319 |
| 7,539,652 | B2 * | 5/2009 | Flinn et al. ............ 706/12 |
| 7,681,112 | B1 * | 3/2010 | Francis ............ 715/201 |
| 2002/0026464 | A1 * | 2/2002 | Jones et al. ............ 708/200 |
| 2002/0116327 | A1 * | 8/2002 | Srinivasan ............ 705/38 |
| 2002/0143819 | A1 * | 10/2002 | Han et al. ............ 707/513 |
| 2003/0187749 | A1 * | 10/2003 | Peled et al. ............ 705/26 |
| 2005/0160088 | A1 * | 7/2005 | Scallan et al. ............ 707/3 |
| 2006/0059097 | A1 | 3/2006 | Kent |
| 2006/0215215 | A1 * | 9/2006 | Kumaran ............ 358/1.15 |

(Continued)

FOREIGN PATENT DOCUMENTS

KR    1020040017988    3/2004

(Continued)

OTHER PUBLICATIONS

UDDI Version 3.0.2—UDDI Spec Technical Committee Draft, Dated 20041019. Available from <http://uddi.org/pubs/uddi-v3.0.2-20041019.htm>. Published Oct. 19, 2004.*

(Continued)

*Primary Examiner* — James A Reagan
*Assistant Examiner* — Calvin Cheung
(74) *Attorney, Agent, or Firm* — Workman Nydegger (57) ABSTRACT

Embodiments described herein are directed to syndicating an online service to at least one syndication partner of a syndicator. In one embodiment, a computer system determines that a syndication relationship has been established between a syndicator and a syndication partner, where the syndication relationship is established to provide syndicated services to syndication partners and clients. The computer system indicates which services provided by the syndicator are available for syndication to the syndication partner and which type of usage information the partner is to provide in order to use the syndicator's services. The computer system receives usage information from the syndication partner specifying which services are to be syndicated and specifying parameters for those services indicating operating parameters specific to the use of the syndicated services. Based on the received usage information, the computer system provides the service to the syndication partner in the manner indicated by the received usage information.

24 Claims, 3 Drawing Sheets

U.S. PATENT DOCUMENTS

| | | | |
|---|---|---|---|
| 2006/0242072 A1* | 10/2006 | Peled et al. | 705/51 |
| 2007/0061487 A1* | 3/2007 | Moore et al. | 709/246 |
| 2007/0094085 A1 | 4/2007 | Redmond et al. | |
| 2007/0288312 A1 | 12/2007 | Wang | |
| 2007/0294100 A1 | 12/2007 | Chen et al. | |
| 2008/0250031 A1* | 10/2008 | Ting et al. | 707/100 |
| 2008/0279161 A1* | 11/2008 | Stirbu et al. | 370/338 |
| 2009/0043842 A1* | 2/2009 | Rhim et al. | 709/203 |
| 2009/0055419 A1* | 2/2009 | Gibbon et al. | 707/101 |
| 2010/0057680 A1* | 3/2010 | Little | 707/3 |
| 2010/0057835 A1* | 3/2010 | Little | 709/203 |
| 2010/0083287 A1* | 4/2010 | Maximilien et al. | 719/328 |
| 2010/0121902 A1* | 5/2010 | Chandrasekhar et al. | 709/202 |
| 2010/0131380 A1* | 5/2010 | Sunkammurali et al. | 705/26 |
| 2010/0169877 A1* | 7/2010 | Ackerman et al. | 717/171 |

FOREIGN PATENT DOCUMENTS

| | | |
|---|---|---|
| KR | 100496355 | 6/2005 |

OTHER PUBLICATIONS

"Self-Service Syndication with ICE." Dr. Dobb's Journal, Jan. 1, 2002. Available from <http://www.drdobbs.com/184413899>.*

Handbook of Applied Cryptography. Menezes et al, 1996. Chapter 10 (pp. 385-424) included. Available from <http://www.cacr.math.uwaterloo.ca/hac>.*

The Information and Content Exchange (ICE) Protocol, Working Draft Version 2.0. Dec. 1, 2003. Available from <http://xml.coverpages.org/ice.html>.*

Brightcove Launches Free Service That Lets Anyone Create and Distribute Commercial Internet TV Channels, Retrieved Oct. 30, 2006 from website: http://www.brightcove.com/about_brightcove/press_releases.cfm?ID=143.

Reinacker, Greg, "NewsGator Syndication Services", Jun. 6, 2007, pp. 1-6.

McElligott, Tim, "Telecom's Response to Over-the-top Providers: Service Syndication", Billing & OSS World, May 8, 2008, pp. 1-2.

Resheff, Eilon, "Syndication Enhances Web Services", Feb. 4, 2002, NetworkWorld website: http://www.networkworld.com/news/tech/2002/0204tech.html.

Govoni, Darren, "Information Syndication Using Web Services", Nov. 30, 2001 from website: http://webservices.sys-con.com/read/39305.html.

Werbach, Kevin, "Syndication: The Emerging Model for Business in the Internet Era", Harvard Business Review, Retrieved Jul. 22, 2008 from website: http://www.harvardbusiness.com/hbsp/hbr/articles/article.jsp.

* cited by examiner

ONLINE SERVICE SYNDICATION

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In many cases, software applications are designed to interact with other software applications or other computer systems. For example, a client computer system might connect to a server in a datacenter to access a service provided by the datacenter. The service could provide simple or very complex functionality, and may be able to communicate with other services in the process. Such services are often referred to as software as a service or SAAS.

In some cases, service developers may desire to offload the finalized service to another person or business for hosting. Such hosting businesses often have proprietary implementations in place, requiring the developer to add specific scripts or other code to enable communication between the hosting company's servers and the developer's service. Moreover, in many cases, hosting servers can only handle limited numbers of user-submitted services.

BRIEF SUMMARY

Embodiments described herein are directed to syndicating an online service to at least one syndication partner of a syndicator. In one embodiment, a computer system determines that a syndication relationship has been established between a syndicator and a syndication partner, where the syndication relationship is established to provide syndicated services to syndication partners and clients. The computer system indicates which services provided by the syndicator are available for syndication to the syndication partner and which type of usage information the partner is to provide in order to use the syndicator's services. The computer system receives usage information from the syndication partner specifying which services are to be syndicated and specifying parameters for those services indicating operating parameters specific to the use of the syndicated services. Based on the received usage information, the computer system provides the service to the syndication partner in the manner indicated by the received usage information.

In another embodiment, a syndicator computer system in a computer networking environment includes a system for syndicating an online service to at least one syndication partner. The system includes a processor, system memory and a service delivery platform configured to establish a syndication relationship between a syndicator and a plurality of different syndication partners, where the syndication relationship is established to provide syndicated services to syndication partners and clients, and where each syndication relationship is established using metadata provided by each syndication partner to the syndicator.

The system also includes a mediation platform that allows each of the syndication partners to integrate with the syndicator through a single point of access. The integration includes providing a catalog listing of all the online services provided by the syndicator including built-in services for managing services syndicated through the syndication relationship, receiving an indication from a syndication partner including metadata that indicates which services are to be syndicated and further indicates parameters for providing the service, and providing those online services indicated in the metadata to the syndication partner, where the services are provided according to the parameters included in the received metadata.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments described herein are directed to syndicating an online service to at least one syndication partner of a syndicator. In one embodiment, a computer system determines that a syndication relationship has been established between a syndicator and a syndication partner, where the syndication relationship is established to provide syndicated services to syndication partners and clients. The computer system indicates which services provided by the syndicator are available for syndication to the syndication partner and which type of usage information the partner is to provide in order to use the syndicator's services. The computer system receives usage information from the syndication partner specifying which services are to be syndicated and specifying parameters for those services indicating operating parameters specific to the use of the syndicated services. Based on the received usage information, the computer system provides the service to the syndication partner in the manner indicated by the received usage information.

In another embodiment, a syndicator computer system in a computer networking environment includes a system for syndicating an online service to at least one syndication partner. The system includes a processor, system memory and a service delivery platform configured to establish a syndication relationship between a syndicator and a plurality of different syndication partners, where the syndication relationship is established to provide syndicated services to syndication partners and clients, and where each syndication relationship is established using metadata provided by each syndication partner to the syndicator.

The system also includes a mediation platform that allows each of the syndication partners to integrate with the syndicator through a single point of access. The integration includes providing a catalog listing of all the online services provided by the syndicator including built-in services for managing services syndicated through the syndication relationship, receiving an indication from a syndication partner including metadata that indicates which services are to be syndicated and further indicates parameters for providing the service, and providing those online services indicated in the metadata to the syndication partner, where the services are provided according to the parameters included in the received metadata.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media including recordable-type storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
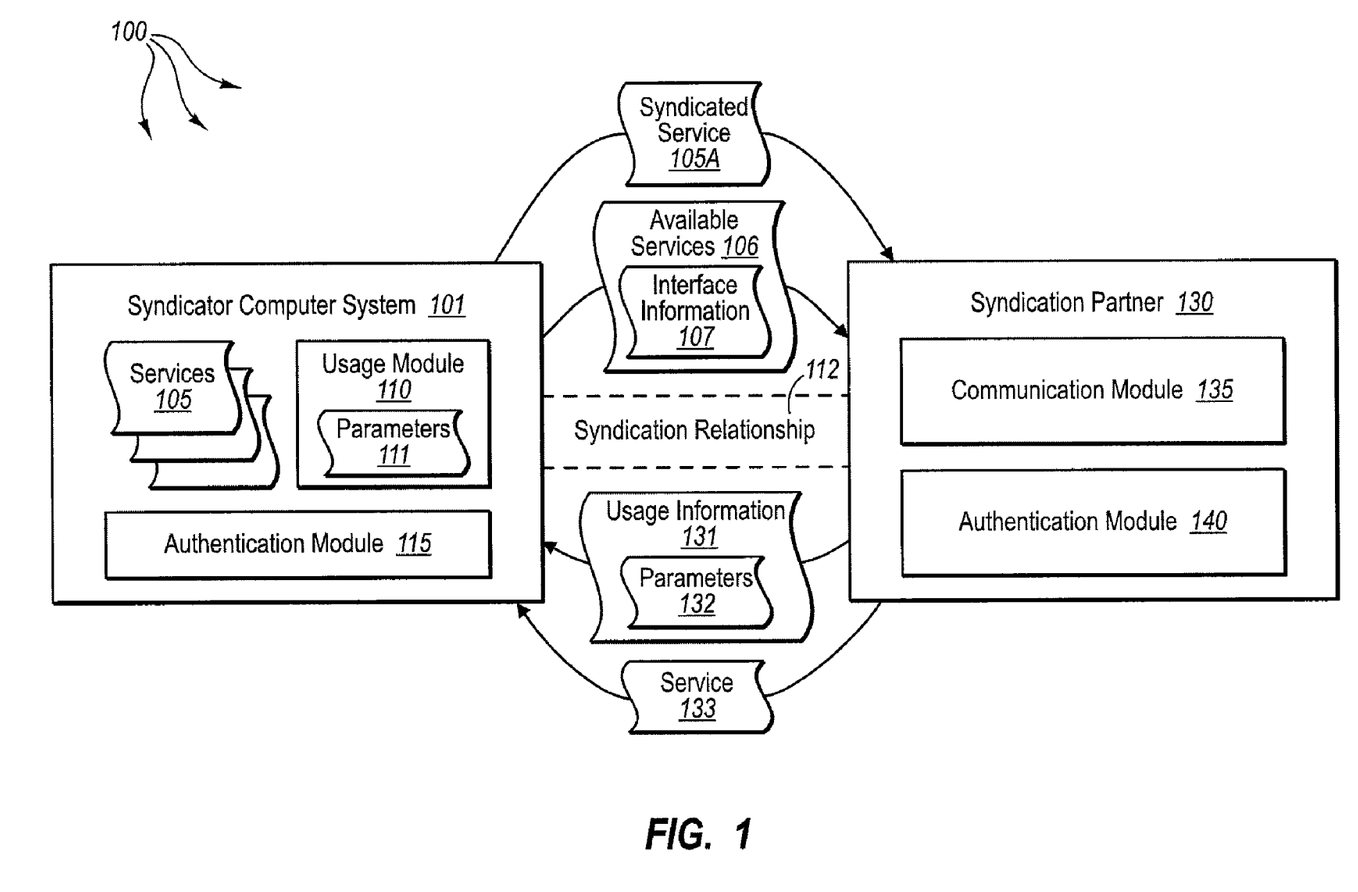
FIG. 1 illustrates a computer architecture in which embodiments of the present invention may operate including syndicating an online service to at least one syndication partner of the syndicator.

FIG. 1 illustrates a computer architecture 100 in which the principles of the present invention may be employed. Computer architecture 100 includes syndicator computer system 101. As used herein, a syndicator refers generally to a provider of services that may be syndicated to syndication partners or other users. The process of syndication generally refers to a first party providing services that are usable by other parties, and that may, in turn, be provided to other parties. For example, a developer may submit a service developed by the developer to a hosting party. The hosting party may provide a group of services, from which the developer can specify which services are to be provided in conjunction with the developer's service. Thus, a third party may access the developer's service that is bundled with, or implements, services provided by the hosting service. In this manner, the developer's service and/or the hosting party's services may be syndicated to a third party. This process will be explained in greater detail below.

Syndicator computer system 101 may include any type of computing system or systems. For instance, syndicator computer system 101 may comprise a single computing system or may be distributed among multiple computing systems. The services and other modules of syndicator computer system 101 may be distributed among a plurality of different computing systems. In a datacenter scenario, various computers in the datacenter may be configured to provide the services of or act as a syndicator computer system.

Syndicator computer system 101 includes services 105, usage module 110 with parameters 111, and authentication module 115. Services 105 may include any type of computer service that provides computing functionality including applets, functions, methods, and/or full software applications. Usage module 110 may be configured to receive usage information 131 including parameters 132 from syndication partner 130. The usage information may include indications of which syndicator-provided services are to be used in conjunction with developer-provided (syndication partner-provided) service 133. It should be noted that syndication partner 130 may or may not be the developer of any services uploaded to or provided to syndicator computer system 101. As mentioned above, a syndication partner may upload service 133 to syndicator computer system 101 for hosting. The partner may also indicate in usage information 131 which syndicator-provided services 105 are to be provided in conjunction with service 133. Parameters 132 may indicate various settings or configurations which are to be used when hosting service 133. Parameters 111 may include received parameters 132 and/or other stored parameters from other syndication partners.

Syndication relationship 112 represents the relationship between syndicator computer system 101 (hereinafter referred to as syndicator 101) and syndication partner 130. Syndicator 101 may establish syndication relationships with multiple different syndication partners (hereinafter simply "partners"). Partner 130 may initiate communication with syndicator 101 using communication module 135. In some cases, partner 130 may use authentication module 140 to authenticate to syndicator 101 which responds using authentication module 115. Once syndication relationship 112 is established, communication between syndicator 101 and partner 130 may occur without login or further authentication. Syndicator 101 may indicate to partner 130 which services are available (e.g. in available services 106) and may send interface information 107 indicating how a partner may interface with and use the services of syndicator 101. Upon receiving usage information and/or service 133, syndicator 101 may provide a syndicated service 105A to syndication partner 130 and/or any other third party users or syndicatees of syndication partner 130. This process will be explained in greater detail below with regard to method 200 of FIG. 2.

Figure 2:
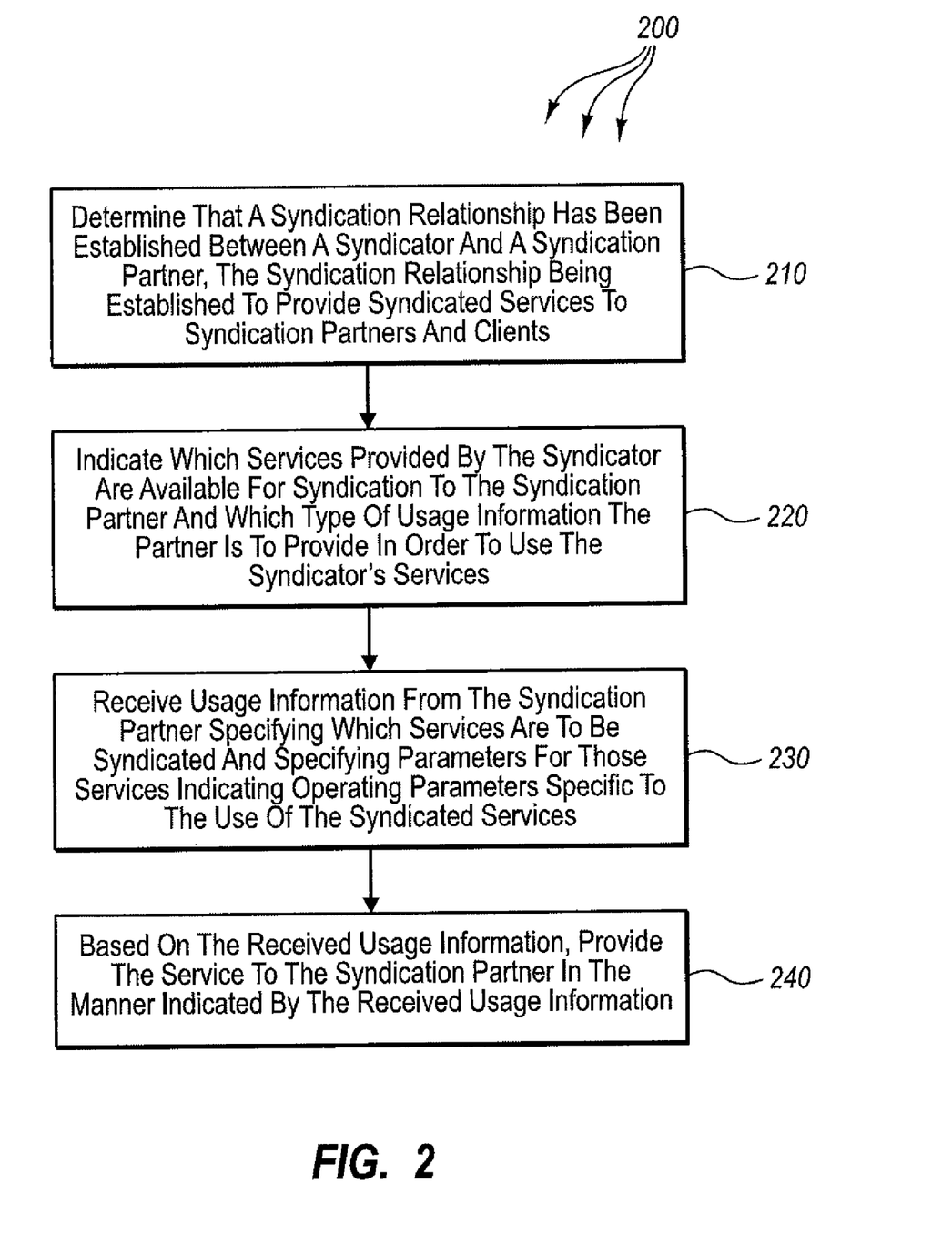
FIG. 2 illustrates a flowchart of an example method for syndicating an online service to at least one syndication partner of the syndicator.

FIG. 2 illustrates a flowchart of a method 200 for syndicating an online service to at least one syndication partner of the syndicator computer system. The method 200 will now be described with frequent reference to the components and data of environment 100.

Method 200 includes an act of determining that a syndication relationship has been established between a syndicator and a syndication partner, the syndication relationship being established to provide syndicated services to syndication partners and clients (act 210). For example, syndicator 101 may determine that syndication relationship 112 has been established between the syndicator and syndication partner 130. Syndication relationship 112 may be established to provide syndicated services 105/105A to syndication partners and other (third party) clients. In some cases, syndicator 101 and partner 130 authenticate to each other in a mutual authentication to establish the syndication relationship. For example, partner 130 may use authentication module 140 to send login credentials or other authentication information to authentication module 115 of syndicator 101. In other cases, relationship 112 may be established through a trusted third party, where both the syndicator 101 and the syndication partner 130 are authenticated by the trusted third party.

In some embodiments, all, or at least a portion, of the syndication partners may establish syndication relationships with syndicator 101 through a single syndicator process. Such a process may also define how information is to be communicated between the syndicator and other syndication partners. Moreover, this process may define escalation rules and alternative paths of communication between partners and the syndicator. For example, if a communication error or other problem occurred, syndicator 101 may determine how such problems are to be handled and/or how to divert communication to another working path.

In some cases, syndicator 101 may, after establishing a syndication relationship with syndication partner 130, receive updated information from a syndication partner. This updated information may change the authentication credentials, usage information, parameters or any other information previously associated with the established syndication relationship between the syndicator and syndicates (partner 130). Each partner's information may be stored in some type of information store on (or accessible by) syndicator 101. This information may be updated automatically upon receiving updated usage information from the syndication partner. Thus, the syndication relationship may be continually updated upon receiving new information from partner 130.

Method 200 includes an act of the syndicator indicating which services provided by the syndicator are available for syndication to the syndication partner and which type of usage information the partner is to provide in order to use the syndicator's services (act 220). For example, syndicator 101 may indicate in indication 106 which services 105 are available for syndication to syndication partner 130 and may further indicate in interface information 107 which type of usage information 131 the partner is to provide to implement services 105. In this manner, a partner may be able to determine which services are available for syndication to the partner and other users. Moreover, the partner may be able to determine from services information 106 which services are best suited to work in combination with the partner's uploaded service(s) 133.

In some embodiments, syndicator 101 may maintain a catalog of all of the services provided by the syndicator that can be syndicated to a syndication partner. This catalog may be provided to the various syndication partners and may be updated periodically as the services provided by the syndicator change. After such updates, all (or a portion) of the syndication relationships may be configured to synchronize between the syndicator and the syndication partner such that the syndication partner is updated and made aware of any changes to the syndicator's offerings (e.g. services 105).

Method 200 includes an act of receiving usage information from the syndication partner specifying which services are to be syndicated and specifying parameters for those services indicating operating parameters specific to the use of the syndicated services (act 230). For example, syndicator 101 may receive usage information 131 from partner 130 specifying which services are to be syndicated and further specifying parameters 132 for those services indicating operating parameters specific to the use of syndicated service(s) 105A. In this manner, partner 130 has control over which services are provided in addition to the partner's service 133. Moreover, partner 130 has control over various configurations and settings associated with the other services provided by syndicator 101. As such, syndicator 101 can provide the partner's service 133 in conjunction with other specified syndicator-provided services 105 as a service bundle. This bundle may be provided to a plurality of different syndication partners and other users.

For example, from the perspective of a third party user, the third party user (or simply, user) may access a services bundle over an internet connection such as the internet or other network connection. The services bundle may include partner-provided service 133 along with any other syndicator-provided services 105 specified by the partner. This bundle of services may be provided to the user according to the configurations and settings specified by parameters 132. The user may be entirely unaware that one or more of the services originated from partner 130 and that one or more of the services in the bundle originated from syndicator 101. Thus, a partner 130 may enter in a syndication relationship with syndicator 101 to provide various services to clients where some (or none) of the services are provided by the partner and some (or none) of the services are provided by the syndicator. Any combination of partner-provided and syndicator-provided services may be used, as indicated by partner 130.

In some cases, syndicator 101 may provide a billing service capable of implementing a partner-specified customized billing scheme for each syndicated service. For example, syndicator 101 may bill partner 130 for each service used by or provided to a client or other partner. Additionally or alternatively, the partner may simply pay for the number of partner-provided services hosted by syndicator 101. Each service may have a different billing level or billing method and may be fully customizable by either the syndicator or the syndication partner, as established in the syndication relationship.

In addition to billing methods and arrangements for various services, the syndicator may also enable the syndication partner to select an appropriate support model for each syndicated service. For instance, partner 130 may determine that a specified support model is to be used with the partner-provided service(s) 133, but that a different support model is to be used with the syndicator-provided service(s) 105. The support model may specify how problems are to be resolved in conjunction with a given service and/or how more serious problems are to be escalated to someone or to a department that can solve the problem. In one specific example, a partner may be able to specify in usage data the action to take if communication fails a certain number (e.g. 5) times. The partner does not have to know how the syndicator will implement that instruction—the partner only has to indicate what they want to have happen in regard to any particular service provided.

Syndicator 101 may also enable the syndication partner to select an appropriate service level agreement for each syndicated service. Thus, for time-critical applications or services such as live video or voice, the partner may specify that a certain level of service is to be guaranteed (e.g. a quality of service (QoS) agreement). For other, less time-critical services, a lower service level agreement may be used. Again, as with the other options mentioned above, service level agreement may be specified on a per-service level, and even on a particular service, may be downgraded or upgraded as the partner or syndicator sees fit.

Continuing with other optional services, the syndicator may enable the syndication partner to select a geo-affinity preference for compliance with appropriate local regulations for each syndicated service. Additionally, the syndicator may enable the syndication partner to select a branding model for each syndicated service, such that each syndicated service can be individually labeled. As outlined above, partner 130 may desire to upload service 133 and have syndicator 101 provide service 133 in combination with other syndicator-provided services 105 to other computer users as a service bundle. In some cases, partner 130 may be able to apply a particular brand name, sound, symbol, etc. to the partner-provided service(s) and/or the entire services bundle. In cases where the partner's brand name is applied to the entire bundle of services, an indication may be provided to the user(s) that some of the services are syndicated and are not owned by or developed by the partner. Rather, that the services were developed by another buy are provided under the partner's brand name due to the syndication relationship.

In some cases, a partner's usage information 131 and/or parameters 132 may be communicated to syndicator 101 in a manner or format that is not understandable by the syndicator. For example, the syndicator may expect that any usage information is sent in extensible markup language (XML) format, and may receive usage information in another format. In such cases, as illustrated in environment 300 of FIG. 3, mediation platform 320 may provides transformation rules for transforming usage information and/or parameters received from the partner into parameters 111 and use information understandable by syndicator 101. In this manner, data fields in use information 131 may be matched the syndicator's corresponding data fields. Mediation platform 320 may be configured to receive and interpret a variety of different information and format types including information stored as metadata.

Figure 3:
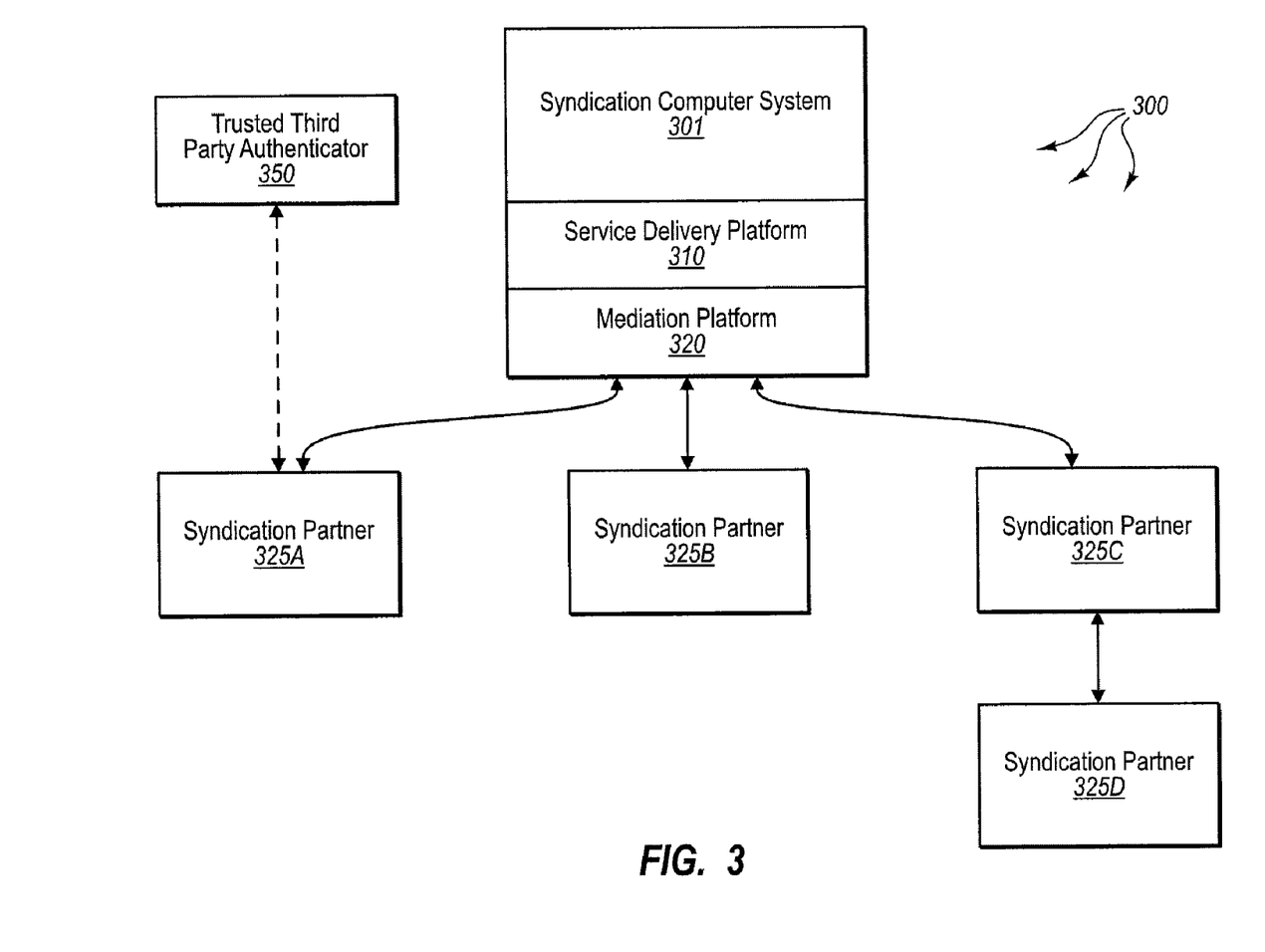
FIG. 3 illustrates an embodiment of the present invention in which various syndication partners interact with a syndicator computer system.

As further illustrated in FIG. 3, syndicator computer system 301 (which may be the same as or different than syndicator computer system 101) includes service delivery platform 310. Service delivery platform 310 may comprise an online service configured to provide services to other users over a network. The service delivery platform and the mediation platform may both be modular and may be configured for operation on the same computer system, on different computer systems or on a distributed computer system. Service delivery platform 310 may be configured to provide services provided by any of syndication partners 325A, 325B, 325C and 325D, as well as services provided by syndication computer system 301. In some embodiments, the mediation platform is configured to interact with partners at a business process level (as opposed to the application programming interface (API) level), and interactions between the process level and the API level are taken care of by the mediation platform. The mediation platform may also allow a partner to change the way in which they provide use information. Because the mediation platform is configured to translate information included in the use data to information usable by the syndicator 301, partners 325A-D need only provide information in a manner compatible with interface information 107, and do not need to inform syndicator 301 when they make changes to the manner in which they provide use information.

Method 200 includes, based on the received usage information, an act of providing the service to the syndication partner in the manner indicated by the received usage information (act 240). For example, syndicator 101 may, based on received usage information 131, provide syndicated service(s) 105A to partner 130 (and/or any other partners and other users) in the manner indicated by usage information 131. As mentioned above, partner-provided service 133 may be provided to other partners or users by itself, or in conjunction with one or more other syndicator-provided services. The services may be provided in accordance with an established syndication relationship 112 between the partner and the syndicator.

In some cases, as illustrated in FIG. 3, a syndication partner (e.g. 325A) may establish such a relationship with syndicator 301 by first establishing a relationship with trusted third party authenticator 350. In such cases, authenticator 350 is trusted by both syndicator 301 and partner 325A. In other cases, a syndication partner (e.g. 325B or 325C) may directly establish such a syndication relationship with syndicator 301. In yet other cases, a syndication partner (e.g. 325D) may establish a syndication relationship with another partner (325C) who, in turn, has an established relationship with the syndicator. Thus, one syndication partner (325C) may syndicate a service provided by the syndicator to a different syndication partner (325D). Syndication to other partners may continue to substantially any level, with each partner potentially adding new, different services which may be provided by syndicator in conjunction with other syndicator-provided services. Along these lines, various different authentication means may be implemented at any point in the syndication relationship establishment process, between the different syndication partners and between the partners and the syndicator.

Syndicator 301 may provide listings of offerings for subscription by partners, such that syndication partners can subscribe to various syndicator offerings by group, or individually. In such scenarios, a partner may select a group such as a billing service, a support model service and a service level agreement service to be used in conjunction with a partner-provided service 133. Many other services and service combinations are possible, and the examples above should not be read as limiting the number or type of service combinations that may be provided by a syndicator. In some cases, the syndicator may reserve a portion of the syndicator's computer resources for providing the syndication partner's syndicated services. As such, the partner may agree to pay more to reserve a portion of resources to ensure that the partner's clients are properly served. Such computer resources may include hard drive space and/or accessing time, network bandwidth, processing time, or any other controllable computer resource.

Thus, a syndication partner may be able to provide a service to a syndicator that is to be provided to other users and/or partners in conjunction with various syndicator-provided services. In addition to any uploaded services, the partner may specify in use information which syndicator services are to be provided and in which manner. This combination of partner-provided and syndicator-provided services may be provided to various other users in accordance with the use information sent by the syndication partner.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a syndicator computer system that is in a computing networking environment and that includes at least one processor, a method for the syndicator computer system to syndicate an online service bundle, which includes at least one syndication partner-submitted service, in a manner specified by the syndication partner, the method comprising:
    an act of a syndicator computer system determining that a syndication relationship has been established between the syndicator computer system and a syndication partner,
        the syndication relationship being established to provide syndicated services to syndication partners and clients according to one or more online services and corresponding usage information provided by the syndication partner,
    wherein the syndicator computer system includes at least one processor;
    an act of the syndicator computer system providing to the syndicator partner
        (1) available service information which indicates one or more services provided by the syndicator computer system are available for syndication, and
        (2) interface information which indicates which type of usage information the syndication partner is to provide to the syndicator computer system in order to use the syndicator computer system's services;
    an act of the syndicator computer system receiving (1) an online service, and (2) usage information from the syndication partner,
        wherein the usage information specifies which one or more particular services of the syndicator computer system's one or more services are to be syndicated in conjunction with the syndication partner's online service, which was received by the syndicator, as a service bundle, as well as parameters for those particular one or more services,
        the parameters indicating operating parameters specific to the use of the particular one or more services; and
    based on the received usage information, an act of the syndicator computer system providing the service bundle, which includes the syndication partner's online service, to at least one of the syndication partners and clients in the manner indicated by the received usage information.

2. The method of claim 1, wherein the syndicator computer system and the syndication partner authenticate to each other in a mutual authentication to establish the syndication relationship.

3. The method of claim 1,
    wherein the syndication relationship is established through a trusted third party, and
    wherein both the syndicator computer system and the syndication partner are authenticated by the trusted third party.

4. The method of claim 1, further comprising:
    an act of the syndicator computer system receiving updated usage information from the syndication partner; and
    based on received updated usage information, an act of the syndicator computer system updating the syndication relationship such that any changes provided in the received update are automatically applied to the established syndication relationship.

5. The method of claim 1, wherein the syndicator computer system maintains a catalog of all of the services provided by the syndicator computer system that can be syndicated to a syndication partner.

6. The method of claim 1, wherein the syndicator computer system defines how information is to be communicated between the syndicator computer system and other syndication partners.

7. The method of claim 1, wherein escalation rules and alternative paths of communication are defined and validated by the syndicator computer system to determine how communication problems are to be handled or diverted.

8. The method of claim 1, further comprising an act of synchronizing the syndicator computer system and at least one syndication partner such that the syndication partner is updated and made aware of any changes to the syndicator computer system's offerings.

9. The method of claim 1, wherein the syndicator computer system provides a billing service capable of implementing a partner-specified customized billing scheme for each syndicated service.

10. The method of claim 1, wherein the syndicator computer system enables the syndication partner to select an appropriate support model for each syndicated service.

11. The method of claim 1, wherein the syndicator computer system enables the syndication partner to select an appropriate service level agreement for each syndicated service.

12. The method of claim 1, wherein the syndicator computer system enables the syndication partner to select a geo-affinity preference for compliance with appropriate local regulations for each syndicated service.

13. The method of claim 1, wherein the syndicator computer system enables the syndication partner to select a branding model for each syndicated service, such that each syndicated service can be individually labeled.

14. The method of claim 1, wherein the syndicator computer system's service offerings are provided for ordering by syndication partners, such that syndication partners can subscribe to various syndicator offerings.

15. The method of claim 1, wherein the syndicator computer system reserves a portion of the syndicator computer system's computer resources for providing the syndication partner's syndicated services.

16. The method of claim 1, wherein the syndicator computer system also provides the service bundle to the syndication partner, as well as to syndicatees of the syndication partner.

17. The method of claim 1, wherein the syndicator computer system also provides the service bundle to the syndication partner, as well as to clients of the syndication partner.

18. The method of claim 1, wherein the usage information also specifies parameters for the online service, the parameters indicating operating parameters specific to the use of the online service.

19. The method of claim 1,
wherein the syndicator computer system enables the syndication partner to select a branding model for the service bundle, and
wherein the branding indicates that some of the services syndicated as part of the service bundle are not owned or developed by the syndication partner.

20. A syndicator computer system in a computer networking environment, the syndicator computer system for syndicating a service bundle to at least one syndication client, the syndicator computer system comprising:
one or more processors;
system memory;
a service delivery platform that establishes a syndication relationship between the syndicator computer system and a plurality of different syndication partners,
the syndication relationship being established to provide syndicated services to syndication partners and clients,
wherein each syndication relationship is established using metadata provided by each syndication partner to the syndicator computer system; and
a mediation platform that integrates each of the plurality of syndication partners with the syndicator computer system through a single point of access, the integration including:
an act of providing a catalog listing of one or more online services provided by the syndicator computer system including built-in services for managing services syndicated through the syndication relationship;
an act of receiving a partner-submitted online service as well as an indication from at least one of the syndication partners, the indication comprising metadata
that indicates which particular one or more online services of the syndicator computer system's one or more online services are to be syndicated in connection with the partner-submitted online service and
that further indicates one or more parameters for providing the particular one or more online services; and
an act of providing the particular one or more online services indicated in the metadata along with the partner-submitted online service to at least the syndication partner of the syndication partners and clients,
wherein the particular one or more online services and the partner-submitted online service are provided to at least the syndication partner as a service bundle according to the parameters included in the received metadata.

21. The syndicator computer system of claim 20, wherein the mediation platform provides transformation rules for transforming parameters received in the metadata to corresponding parameters of the syndicator computer system, such that the parameters in the syndicator computer system's data fields correspond to the parameters in the syndication partner's data fields.

22. The syndicator computer system of claim 21, wherein the service delivery platform and the mediation platform are modular and are configured for operation on the same computer system, on different computer systems or on a distributed computer system.

23. The syndicator computer system of claim 21, wherein at least one of the syndication partners syndicates a service provided by the syndicator computer system to a second, different syndication partner.

24. One or more physical storage devices storing computer-executable instructions which, when executed by at least one computing processor, implement a method for syndicating an online service bundle to a syndication client at the request of at least one syndication partner of a syndicator computer system, the method including:
an act of a syndicator computer system determining that a syndication relationship has been established between the syndicator computer system and a syndication partner,
the syndication relationship being established to provide syndicated services to at least the syndication partner according to syndication partner-submitted online services and syndication partner-provided usage information,
wherein the syndicator computer system includes at least one processor;
an act of the syndicator computer system indicating
which one or more services provided by the syndicator computer system are available for syndication and
which type of usage information the syndication partner is to provide to the syndicator computer system in order to use the syndicator computer system's services;
an act of the syndicator computer system receiving a syndication partner-submitted online service and syndication partner-provided usage information,
wherein the syndication partner-provided usage information specifies which particular one or more services of the syndicator computer system's one or more services are to be combined with the syndication partner-submitted online service and syndicated to syndication partners and clients as a service bundle, as well as parameters for the service bundle, the parameters indicating operating parameters specific to the use of the service bundle; and
based on the received usage information, an act of the syndicator computer system providing the service bundle to at least the syndication partner in the manner indicated by the received usage information.

* * * * *